United States Patent
Nishimura et al.

(10) Patent No.: US 8,286,468 B2
(45) Date of Patent: Oct. 16, 2012

(54) CYLINDRICAL INTERNAL SURFACE PROCESSING APPARATUS

(75) Inventors: Kimio Nishimura, Yokohama (JP);
Akihiko Ikeda, Kawasaki (JP);
Kiyokazu Sugiyama, Chigasaki (JP);
Junichi Uchiyama, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 258 days.

(21) Appl. No.: 12/899,856

(22) Filed: Oct. 7, 2010

(65) Prior Publication Data

US 2011/0023777 A1    Feb. 3, 2011

Related U.S. Application Data

(63) Continuation of application No. 11/704,958, filed on Feb. 12, 2007, now Pat. No. 7,851,046.

(30) Foreign Application Priority Data

Mar. 7, 2006  (JP) ................................. 2006-061429
Nov. 10, 2006 (JP) ................................. 2006-305492

(51) Int. Cl.
*G01B 5/28*    (2006.01)
(52) U.S. Cl. ......................................................... 73/105
(58) Field of Classification Search ........................ None
See application file for complete search history.

(56) References Cited

U.S. PATENT DOCUMENTS 5,626,674 A   5/1997   VanKuiken, Jr. et al.
6,622,685 B2  9/2003   Takahashi et al.
2005/0044707 A1  3/2005  Izquierdo et al.

FOREIGN PATENT DOCUMENTS

| CN | 2425357 Y | 3/2001 |
|---|---|---|
| CN | 1387586 A | 12/2002 |
| GB | 862806 A | 3/1961 |
| JP | 2002-155350 A | 5/2002 |
| JP | 2003-213399 A | 7/2003 |
| JP | 2005-161387 A | 6/2005 |
| WO | WO-02/40850 A1 | 5/2002 |
| WO | WO-2006/040746 A2 | 4/2006 |

*Primary Examiner* — Peter Macchiarolo
*Assistant Examiner* — Alex Devito
(74) *Attorney, Agent, or Firm* — Global IP Counselors, LLP

(57) ABSTRACT

A cylindrical internal surface processing apparatus has an internal diameter measuring device and a controller. The internal diameter measuring device measures an internal diameter of an internal cylindrical bore formed in a base member to obtain a measurement result of the internal diameter of the internal cylindrical bore. The controller includes a surface roughening control section and a quality determining section. The surface roughening control section controls operation of a surface roughening equipment to form a rough surface section and an internal diameter measuring surface section on the internal cylindrical bore. The internal diameter measuring surface section is smoother than the rough surface section. The quality determining section determines if the rough surface section is acceptable to allow a subsequent thermally sprayed coating to be applied on the rough surface section based on the internal diameter measurement result at the internal diameter measuring surface section of the internal cylindrical bore.

8 Claims, 9 Drawing Sheets

CYLINDRICAL INTERNAL SURFACE PROCESSING APPARATUS

CROSS-REFERENCE TO RELATED APPLICATIONS

This application is a divisional application of U.S. patent application Ser. No. 11/704,958 filed on Feb. 12, 2007. The entire disclosure of U.S. patent application Ser. No. 11/704,958 is hereby incorporated herein by reference. This application claims priority to Japanese Patent Application Nos. 2006-061429, filed on Mar. 7, 2006 and 2006-305492, filed on Nov. 10, 2006. The entire disclosures of Japanese Patent Application Nos. 2006-061429 and 2006-305492 are hereby incorporated herein by reference.

BACKGROUND

1. Field of the Invention

The present invention relates to a base member having a cylindrical internal surface and a thermally sprayed coating formed on a section of the cylindrical internal surface that has been formed into a rough surface. The present invention further relates to a cylindrical internal surface processing method and a cylindrical internal surface processing apparatus.

2. Background Information

Typically, aluminum engine blocks of internal combustion engines have cylinder liners provided in their cylinder bores. From the viewpoint of improving the output, fuel economy, and exhaust performance of internal combustion engines having aluminum cylinder blocks and from the viewpoint of reducing the size and weight of such engines, there is a very high demand for an engine design that eliminates the cylinder liners that are used in the cylinder bores of aluminum engine blocks. One alternative to cylinder liners is to use thermal spraying technology to form a thermally sprayed coating on the internal surfaces of the cylinder bores.

When thermal spraying technology is applied to a cylinder bore, a coating is formed on the internal surface of the cylinder bore using a thermal spray gun configured to spray molten coating material. The coating is deposited by moving the thermal spray gun in the axial direction inside the cylinder bore while rotating the thermal spray gun. After the thermally sprayed coating is formed, the surface of the coating is finished by grinding using a honing process or other machining process.

Before such a thermally sprayed coating is deposited, the internal surface of the base material of the cylinder bore is roughened using, for example, the surface treatment proposed in Japanese Laid-Open Patent Publication No. 2003-213399 (see FIGS. 2 to 7). The surface roughening serves to improve the adhesion of the thermally sprayed coating.

SUMMARY

It has been discovered that when a thermally sprayed coating is formed on the internal surface of the internal cylindrical bore such as a cylinder bore, it is necessary to ensure that the proper coating thickness is obtained. Consequently, it is necessary to measure the internal diameter of the internal cylindrical bore before the thermally sprayed coating is deposited.

However, since the internal surface of the internal cylindrical bore is roughened before the thermally sprayed coating is deposited in order to improve the adhesion of the thermally sprayed coating, the internal diameter of the internal cylindrical bore cannot be measured accurately and there are times when the thermally sprayed coating cannot be made to the proper thickness.

The object of the present invention is to enable an internal diameter of an internal cylindrical bore to be measured accurately before a thermally sprayed coating is deposited thereon.

In accordance with one aspect of the present disclosure, a cylindrical internal surface processing apparatus is provided that basically comprises an internal diameter measuring device and a controller. The internal diameter measuring device is configured to measure an internal diameter of an internal cylindrical bore formed in a base member to obtain a measurement result of the internal diameter of the internal cylindrical bore. The controller includes a surface roughening control section and a quality determining section. The surface roughening control section is configured to control operation of a surface roughening equipment to form a rough surface section and an internal diameter measuring surface section on the internal cylindrical bore of the base member, with the internal diameter measuring surface section being smoother than the rough surface section. The quality determining section is configured to determine if the rough surface section is acceptable to allow a subsequent thermally sprayed coating to be applied on the rough surface section based on the internal diameter measurement result obtained by the internal diameter measuring device at the internal diameter measuring surface section of the internal cylindrical bore.

This aspect and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
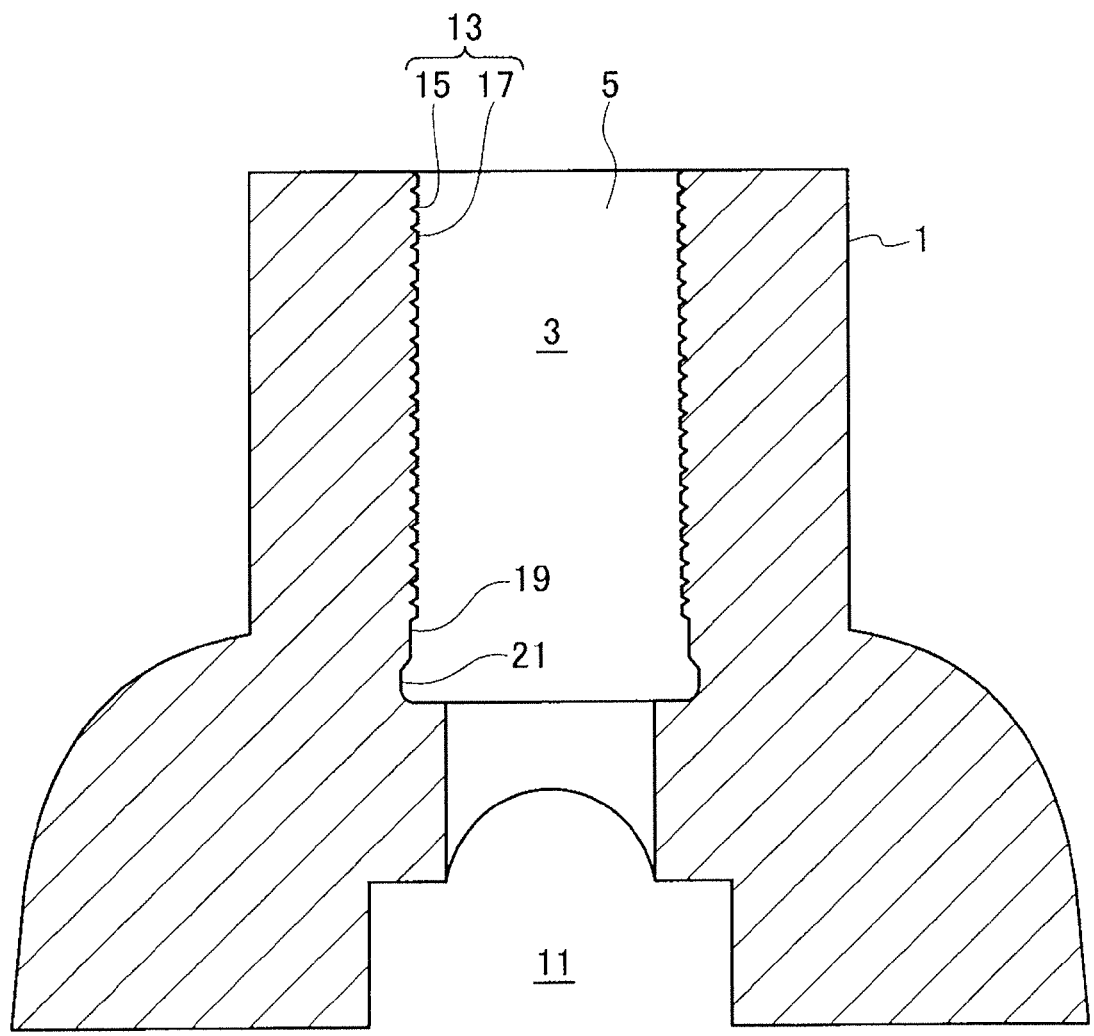
FIG. 1 is a transverse cross sectional view of a cylinder block having a cylinder bore (internal cylindrical bore) with a thermally sprayed coating formed on its cylindrical internal surface in accordance with a first embodiment.
Figure 2:
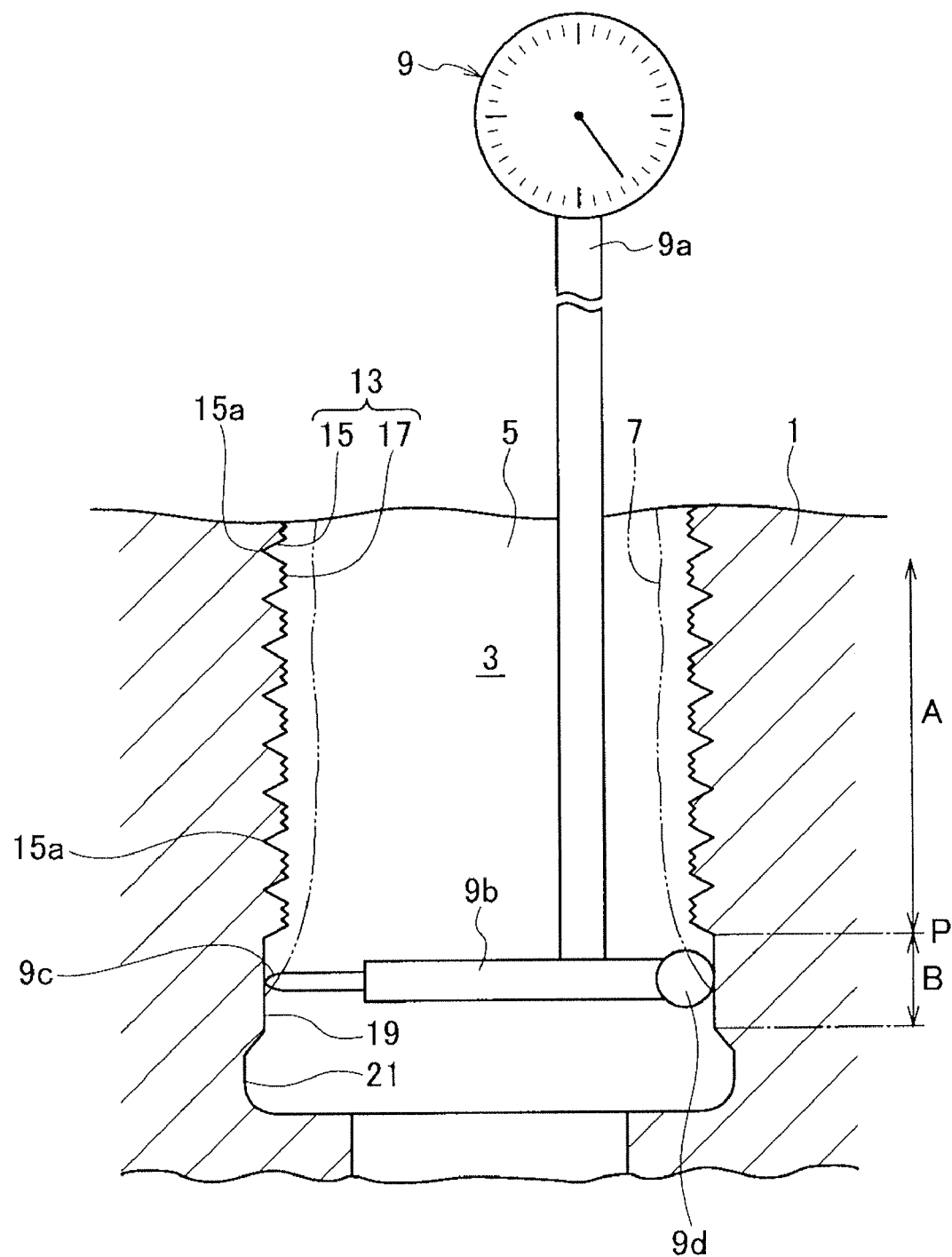
FIG. 2 is an enlarged cross sectional view of an end portion of the cylinder block shown in FIG. 1 that is closer to a crankcase.

Referring initially to FIG. 1, a cylinder block is illustrated as a base member in accordance with a first embodiment. The cylinder block 1 has a cylinder bore 3 that is an internal cylindrical bore with an internal cylindrical surface 5. A thermally sprayed coating 7 is formed on the cylinder bore internal surface 5 using a method that is described later (see diagram (d) of FIG. 3). After the thermally sprayed coating 7 is formed, it is finished using a finishing method described later (honing in this embodiment). FIG. 1 shows the internal cylindrical surface 5 after it has been made into a rough surface 13 and before the thermally sprayed coating 7 has been deposited. FIG. 2 shows the internal diameter of the internal cylindrical surface 5 being measured with an internal diameter measuring instrument 9 that constitutes an internal diameter measuring device or section.

Figure 6A:
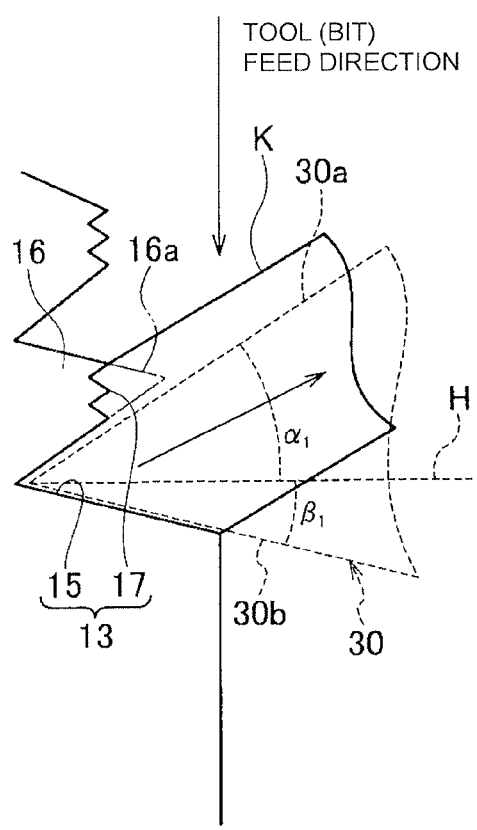
FIG. 6A is an enlarged cross sectional view of a portion of the cylindrical internal surface illustrating how the base material surface roughening process shown in FIG. 4 is executed using a tool and the discharged cut waste material.

FIG. 2 is an enlarged cross sectional view of the end portion of the cylinder block 1 located axially closer to the crankcase 11. The rough surface 13 extends axially from the upper end of the internal cylindrical surface 5 to a position near the bottom end. As seen in FIGS. 2 and 6A, the rough surface 13 has a helical (screw-shaped) recessed cut portion 15 and a ridge portion 16 with a finely serrated portion 17 that is also helical. The serrated portion 17 is arranged adjacent to the recessed cut portion 15. By forming the rough surface 13 in this way, the adhesion of the thermally sprayed coating 7 deposited afterwards can be improved.

An internal diameter measurement surface 19 that is smoother than the rough surface 13 is formed on a portion of the internal cylindrical surface 5 immediately below the rough surface 13. Thus, as shown in FIG. 2, the internal cylindrical surface 5 has rough surface section A where the rough surface 13 is formed and an internal diameter measurement section B where the internal diameter measurement surface 19 is formed. The internal diameter of the cylinder bore 3 at the internal diameter measurement surface 19 is the same as the internal diameter of the cylinder bore 3 at the deepest portion 15a (bottom) of the cut portion 15. An escape section 21 having a larger diameter than the internal diameter measurement surface 19 is provided below the internal diameter measurement surface 19. By measuring the internal diameter at the smooth internal diameter measurement surface 19, the internal diameter of the cylinder bore 3 at a rough surface section A containing the rough surface 13 can be measured accurately before forming the thermally sprayed coating 7 on the internal surface of the cylinder bore 3.

In particular, as shown in FIG. 2, the internal diameter of the cylinder bore 3 is measured at the internal diameter measurement surface 19 with the internal diameter measuring instrument 9 when the rough surface 13 has been formed on the internal cylindrical surface 5 and the smooth internal diameter measurement surface 19 has been formed directly below the rough surface 13. The internal diameter measuring instrument 9 includes a rod 9a, a horizontal arm 9b, a probe 9c and a roller 9d. The rod 9a extends in the vertical direction in FIG. 2. The horizontal arm 9b is attached to the bottom end of the rod 9a. The measuring probe 9c is provided on a front end of the horizontal arm 9b. The roller 9d is provided on a rear end of the horizontal arm 9b. The measuring probe 9c is capable of extending and retracting with respect to the horizontal arm 9b.

In order to measure the internal diameter of the cylinder bore 3 before the thermally sprayed coating is formed, the roller 9d is put into contact with the internal diameter measurement surface 19 and the measuring probe 9c is put into contact with the internal diameter measurement surface 19 at a position opposite the position where the roller 9d is contacting.

After measuring the internal diameter, an acceptability determination is made as to whether or not the measurement result is acceptable (i.e., good or bad) and the processing proceeds to a subsequent thermally sprayed coating forming step only if the result is acceptable (i.e., "Good"). If the result is unacceptable (i.e., "Bad"), then the thermally sprayed coating forming step is aborted.

Since the internal diameter measuring surface 19 is smoother than the rough surface 13, the internal diameter of the cylinder bore 3 can be measured accurately and easily before the thermally sprayed coating 7 is formed and the thermally sprayed coating 7 can be made to the proper thickness in a uniform manner.

Figure 3:
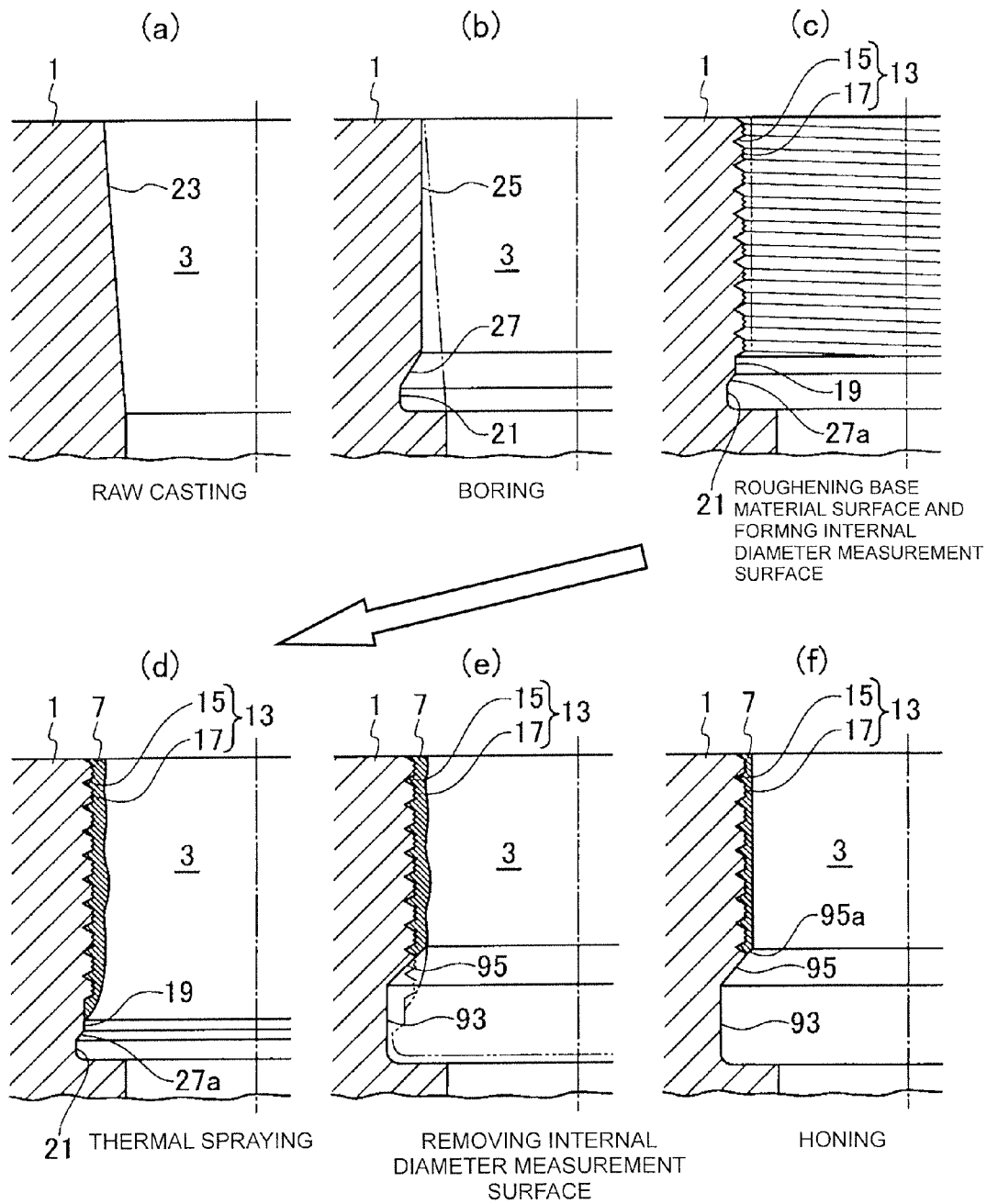
FIG. 3 is a series of cross sectional views of a portion of the cylindrical internal surface illustrating the processing applied to the cylinder bore of the cylinder block shown in FIG. 1.
Figure 4:
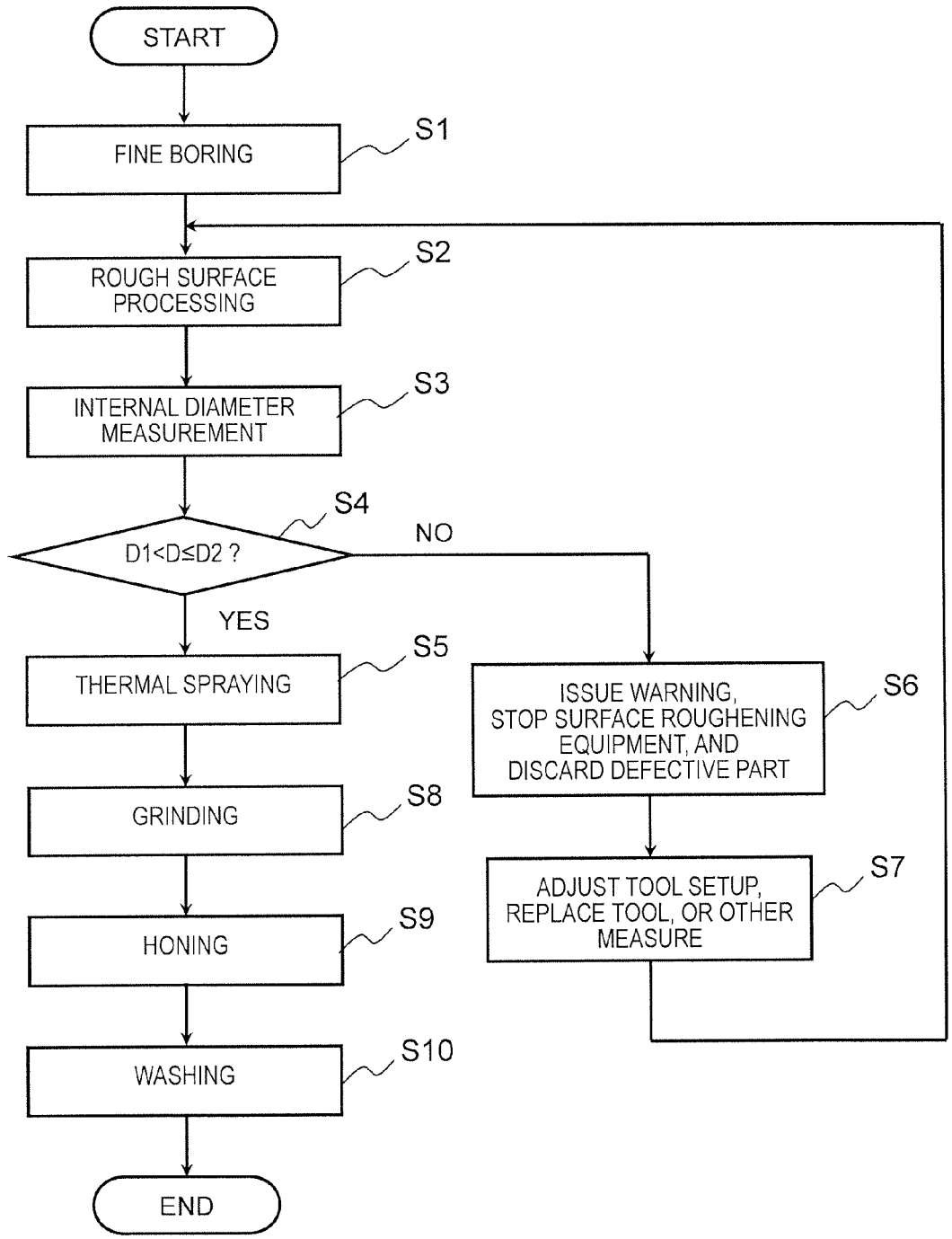
FIG. 4 is a flowchart presenting the processing steps applied to the internal cylindrical bore of the cylinder block shown in FIG. 1.

Although FIG. 2 shows a case in which the internal diameter is measured manually with an internal diameter measuring instrument 9, it is also acceptable to measure the internal diameter automatically with a three-dimensional measuring instrument. FIG. 3 shows the left-hand portion of the view of the cylinder bore 3 shown in FIG. 2 and illustrates the processing steps applied to the cylinder bore 3. FIG. 4 is a flowchart showing the order of the processing steps illustrated in FIG. 3. The processing steps will now be explained with reference to FIGS. 3 and 4.

Diagram (a) of FIG. 3 shows the state of the cylinder block 1 after casting. The cylinder bore 3 has a tapered section 23 configured to decrease in diameter as one moves downward (i.e., downward from the perspective of FIG. 3) toward the crankcase 11. Diagram (b) of FIG. 3 shows the cylinder bore 3 after the tapered section 23 shown in diagram (a) of FIG. 3 has been subjected to a fine boring process with a boring device (not shown) (step S1). The fine boring is performed to create a uniform diameter section 25 having a uniform internal diameter. The uniform diameter section 25 spans the entire length of the tapered section 23, except for a lower end section thereof. The boring device comprises a boring bar with a tool arranged around the outside perimeter of a tip end thereof. The fine boring is accomplished by rotating the boring bar while inserting the boring bar into the cylinder bore 3 from above.

After forming the uniform diameter section 25, the boring device forms a downwardly widening tapered section 27 directly below the uniform diameter section 25 (at the lower end of the cylinder bore 3) and the escape section 21 shown in FIG. 2 directly below the tapered section 27. The tapered section 27 and the escape section 21, which have larger diameters than the uniform diameter section 25, are formed by rotating the boring bar eccentrically with respect to the main axis of the boring device.

After the fine boring shown in diagram (b) of FIG. 3, the rough surface 13 is formed in the uniform diameter section 25 of the internal cylindrical surface 5 as shown in diagram (c) of FIG. 3 by executing a base material surface roughening process (step S2). Diagram (c) of FIG. 3 corresponds to FIG. 2.

Figure 5:
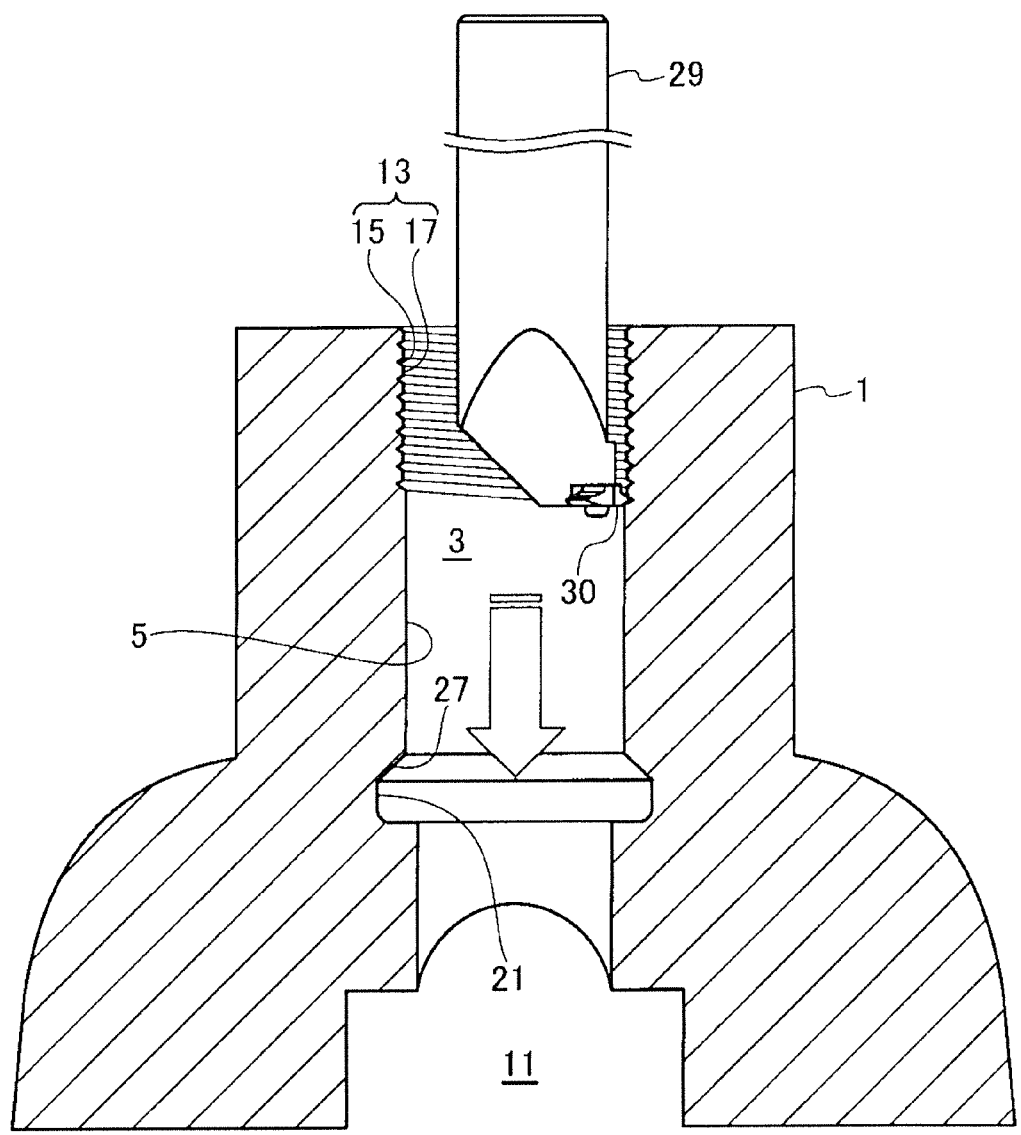
FIG. 5 is a cross sectional view of the cylinder block in which a roughening process is being applied to the cylindrical internal surface of the base material of the cylinder block shown in FIG. 1.

The base material surface roughening process is performed as shown in FIG. 5 using a boring device similar to that used for the boring processing shown in diagram (b) of FIG. 3. A tool (bit) 30 is mounted to the outer perimeter of the tip end of the boring bar 29 of the boring device. The boring bar 29 is simultaneously rotated and moved axially downward so as to form a screw thread along the internal cylindrical surface 5. The resulting rough surface of the base material has the helical recessed cut portion 15 and the finely serrated portion 17 arranged helically adjacent to the cut portion 15.

Figure 6B:
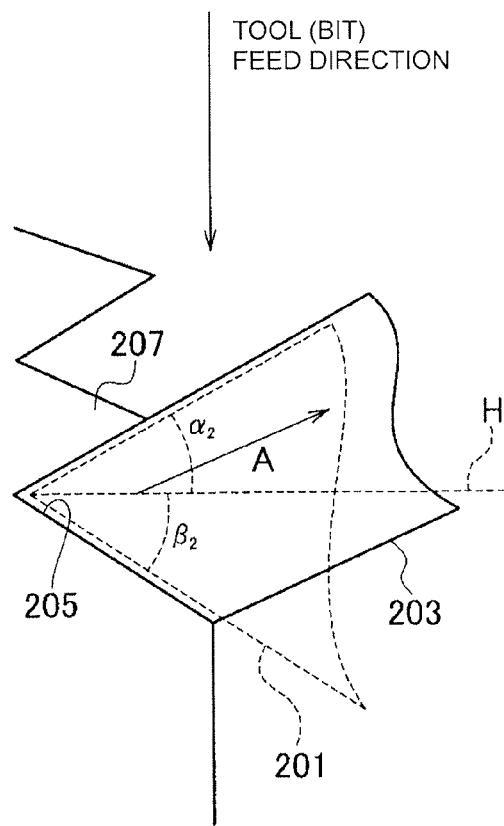
FIG. 6B is an enlarged cross sectional view of a portion of the cylindrical internal surface illustrating a typical screw thread cutting process executed using a tool.

FIG. 6A shows the cut portion 15 and the ridge portion 16 with the finely serrated portion 17 being formed in the uniform diameter section 25 of the cylinder bore 3 with the tool 30 so as to create the rough surface 13. FIG. 6B shows a reference example illustrating a normal screw thread being cut with a tool 201. In FIG. 6B, the tool 201 is rotated and moved downward simultaneously and the cut waste material 203 is discharged in the direction of the arrow A. As a result, a valley portion 205 (a bottom of a recess) and a ridge portion 207 are formed with a normal screw thread cutting process.

Meanwhile, in FIG. 6A, while the cut portion 15 (which is a recess corresponding to the valley portion 205 of FIG. 6B) is being cut by the tool 30, the discharged waste material K is used to truncate the peak 16a of the part of the ridge portion 16 (which corresponds to the ridge portion 207 of FIG. 6B) adjacent to the part of the cut portion 15 (valley portion) currently being cut, thereby forming a finely serrated portion 17.

The tool 30 shown in FIG. 6A is configured such that the angle α1 of the surface 30a (the side facing in the opposite direction as the feed direction of the tool, i.e. upward) with respect to a horizontal plane H is approximately 30 degrees, which is larger than the corresponding angle α2 of the tool 201 shown in FIG. 6B. Meanwhile, the angle β1 of the surface 30b (the side facing in the same direction as the feed direction of the tool, i.e. downward) with respect to the horizontal plane 30 is approximately 10 degrees, which is smaller than the corresponding angle β2 of the tool 201 shown in FIG. 6B. As a result, in the case shown in FIG. 6A, the waste material K discharged when the cut portion 15 is formed is pushed against the adjacent ridge portion 16 by the slanted surface 30a facing in the opposite direction of the tool feed direction. The peak 16a of the ridge portion 16 is truncated by the waste material K in such a manner as to form a finely serrated portion 17.

Immediately after forming the rough surface 13 in the uniform diameter section 25, the internal diameter measurement surface 19 shown in FIG. 2 is formed in the tapered section 27. The internal diameter measurement surface 19 is formed using the boring bar 29 and the tool 30 shown in FIG. 5, but the tool feed speed is slower than the tool feed speed used when processing the rough surface 13. As shown in FIG. 2, the internal diameter measurement section B having the internal diameter measurement surface 19 is formed immediately below the rough surface section A where the rough surface 13 is formed. The feed speed of the tool 30 in the axial direction of the cylinder bore 3 is changed at a boundary P between the sections A and B. By reducing the tool feed speed when processing the internal diameter measurement section B located below the boundary P, the internal diameter measurement surface 19 is processed to be smoother than the rough surface 13.

Since the same tool 30 is used to form both the rough surface 13 and the internal diameter measurement surface 19 and since the internal diameter measurement surface 19 is formed using a slower tool feed speed than the tool feed speed used to form the rough surface 13, the manufacturing process can be contrived such that processing of the internal diameter measurement surface 19 proceeds directly after processing of the rough surface 13 in a continuous fashion, thus enabling the processing time to be reduced and the processing efficiency to be improved.

As explained previously, the internal diameter of the cylinder bore 3 at the internal diameter measurement surface 19 is the same as the internal diameter of the cylinder bore 3 at the deepest portion 15a of the cut portion 15. Also internal diameter of the cylinder bore 3 at the internal diameter measurement surface 19 is smaller than the internal diameter of the escape section 21. A portion 27a of the tapered surface 27 shown in diagram (b) of FIG. 3 remains between the internal diameter measurement surface 19 and the escape section 21.

Since, as explained previously, the internal diameter of the cylinder bore 3 at the internal diameter measurement surface 19 is the same as the internal diameter of the cylinder bore 3 at the deepest portion 15a of the cut portion 15, the manufacturing process can be performed such that it continues directly from processing of the rough surface 13 to processing of the internal diameter measurement surface 19 by merely reducing the tool feed speed. As a result, the processing can be executed efficiency.

After the rough surface 13 and the internal diameter measurement surface 19 shown in diagram (c) of FIG. 3 have been formed, the internal diameter D is measured with the internal diameter measuring instrument 9 shown in FIG. 2 (step S3).

Figure 7:
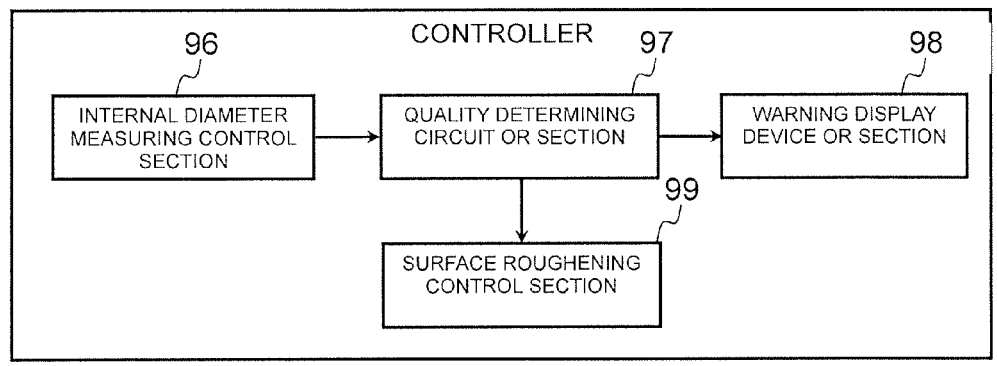
FIG. 7 is a block diagram of a control configuration that compares a measured internal diameter to a threshold value in order to determine if the internal diameter is acceptable (i.e., good or bad)

FIG. 7 is a block diagram showing the control configuration of a controller that compares the measured internal diameter D to a prescribed lower limit threshold value D1 and a prescribed upper limit threshold value D2 to determine if the internal diameter D is acceptable (i.e., good or bad). The control configuration of the controller includes an internal diameter measuring control section 96, a quality determining circuit or section 97, a warning display device or section 98 and a surface roughening control section 99. The internal diameter measuring control section 96 receives the measurement results from the internal diameter measuring instrument 9. The quality determining circuit 97 serves as a quality determining device that is provided with a memory (storage device) in which the prescribed lower limit threshold value D1 and the prescribed upper limit threshold value D2 are stored. If the measured internal diameter measurement value D is equal to or smaller than the lower limit threshold value D1 or larger than upper limit threshold value D2, then the base member or cylinder block 1 is defective and the measurement result is unacceptable (i.e., "Bad"). The quality determining circuit or section 97 sends a signal for displaying the warning to the warning display device or section 98. The warning display device 98 preferably includes a monitor or the like. The surface roughening control section 99 controls the operation of the surface roughening (treating) equipment, e.g., the boring bar 29, the tool 30 and the honing device 105.

Basically, the lower and upper limit threshold values D1 and D2 are set to obtain a range for a final target internal diameter to be obtained by honing the thermally sprayed coating. If the internal diameter of the base material along the rough surface 13 is too small, then the base material along the rough surface 13 will be exposed, i.e., all of the coating will be removed, before the desired final diameter can be achieved with the honing process. On the other hand, if the internal diameter of the base material along the rough surface 13 is too large, the base material along the rough surface 13, then not all of the coating on the base material along the rough surface 13 will be processed, i.e., not all of the coating will be honed, when the desired final diameter has been achieved with the honing process.

Thus, the lower limit threshold value D1 corresponds to an internal diameter with which at least a portion of the base material along the rough surface 13 will become exposed when the surface of the thermally sprayed coating shown in diagram (f) of FIG. 3 is honed with a specific honing tool, i.e., the honing tool 105 shown in FIG. 9 (described later). More specifically, the base material will not become exposed when the thermally sprayed coating is honed if the internal diameter measurement value D is larger than the lower limit threshold value D1. Conversely, at least a portion of the base material will become exposed due to too much removal of the thermally sprayed coating during honing if the internal diameter threshold value D is equal to or smaller than the lower limit threshold value D1.

Figure 9:
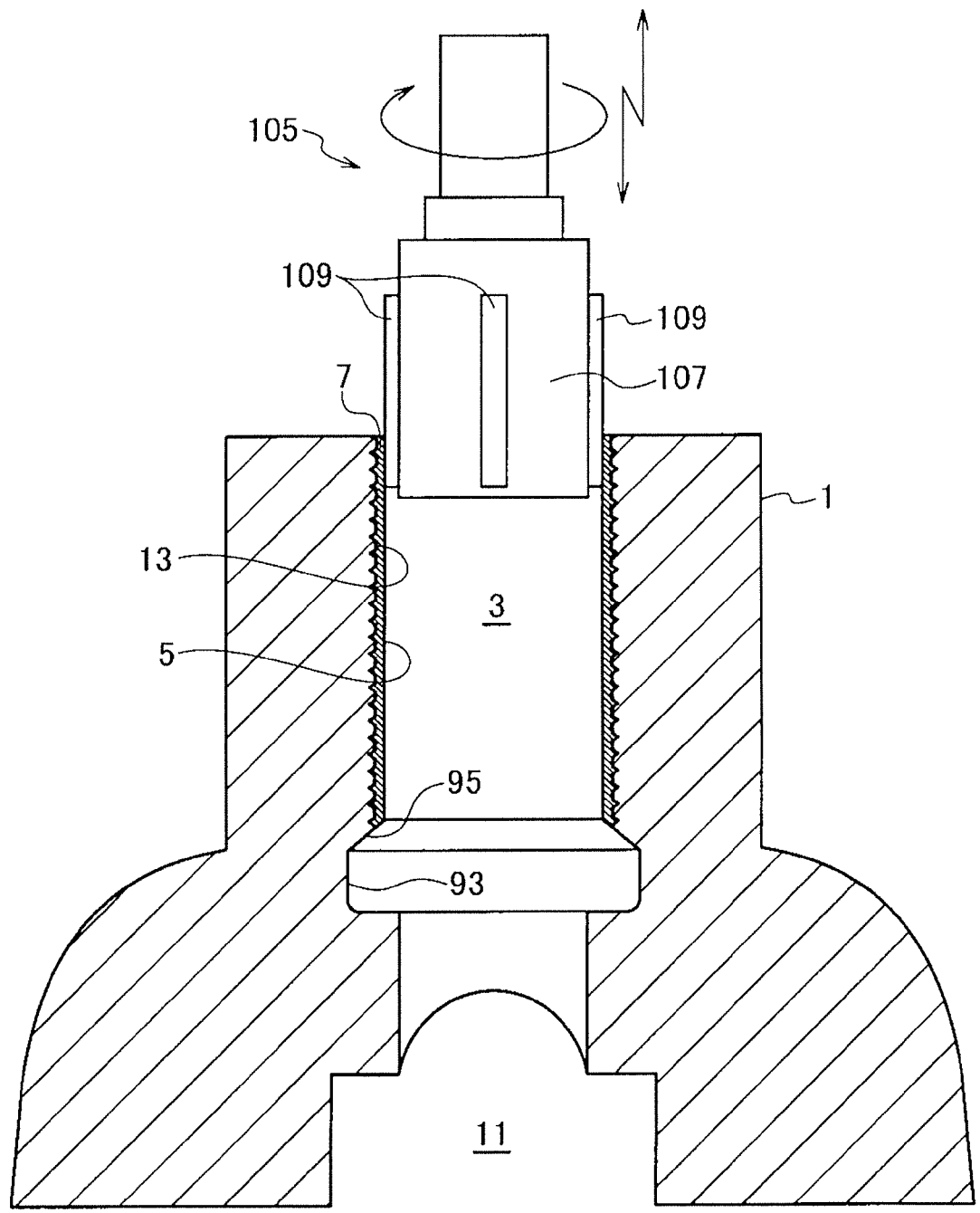
FIG. 9 is a cross sectional view of the cylinder block shown in FIG. 1 illustrating the thermally sprayed coating being honed with a honing tool.

Meanwhile, the upper limit threshold value D2 corresponds to an internal diameter with which is possible to process the entire surface of the thermally sprayed coating that is to be processed when the thermally sprayed coating shown in diagram (f) of FIG. 3 is honed with a specific honing tool, i.e., the honing tool 105 shown in FIG. 9. In other words, the upper limit threshold value D2 is a value for which there will be no portion of the thermally sprayed coating left unprocessed after the honing is completed. More specifically, the entire surface of the thermally sprayed coating to be processed can be processed (honed) if the internal diameter measurement value D is equal to or smaller than the upper limit threshold value D2. Conversely, there will be a portion or portions of the surface of the thermally sprayed coating that remain unprocessed (untouched) by the honing stones 109 of the honing tool 105 if the internal diameter measurement value D is larger than the upper limit threshold value D2.

The threshold values D1 and D2 are determined based on the error (variation) of the honing process and the error (variation) of the thickness distribution of the thermally sprayed coating in the axial and circumferential directions (actually the error of the internal diameter at a particular position on the surface of the thermally sprayed coating, i.e., portion of the internal cylindrical bore where the coating is formed). The error (variation) of the coating thickness in the axial direction is chiefly in the form of the cylinder bore 3 being tapered along the axial direction, and the error (variation) of the coating thickness in the circumferential direction is chiefly in the form of the cylinder bore 3 being oval instead of circular.

After the internal diameter is measured in step S3, the quality determining circuit 97 acquires the internal diameter measurement value D and determines if the internal diameter measurement value D is larger than the lower limit threshold value D1 and equal to or smaller than the upper limit threshold value D2 (step S4).

If the internal diameter measurement value D is larger than the lower limit threshold value D1 and equal to or smaller than the upper limit threshold value D2 (i.e., if the result of step S4 is Yes), then the radially outward facing surfaces of the honing stones 109 (which face the surface of the thermally sprayed coating) are within the range of the coating thickness in the thickness direction and the honing process will not cause the base material to become exposed by removing too much of the thermally sprayed coating or the like. Furthermore, the radially outward facing surfaces of the honing stones 109 will contact the entire surface of the thermally sprayed coating and there will not be any portions left unprocessed (untouched) by the honing stones 109. In short, the measurement result is determined to be acceptable and a signal is sent to the surface roughening control section 99 shown in FIG. 7 so as to continue to a subsequent thermally sprayed coating formation step (step S5).

Conversely, if the internal diameter measurement value D is equal to or smaller than the lower limit threshold value D1 or larger than the upper limit threshold value D2 (i.e., if the result of step S4 is "No"), then, as described previously, at least a portion of the base material will become exposed due to too much removal of the thermally sprayed coating during honing or there will be a portion or portions of the surface of the thermally sprayed coating that remain unprocessed (untouched) by the honing stones 109. In other words, the honing process will fail if it is attempted. Consequently, the internal cylindrical bore is considered to be defective and the measurement result is unacceptable (i.e., "Bad"). A signal for displaying a warning is sent to the warning display device 98, the operation of the surface roughening control section 99 is stopped, and the defective part is discarded (step S6).

After the surface roughening control section 99 is stopped, the cause of the defective (bad) part is investigated and corrected (step S7). If the internal diameter measurement value D is equal to or smaller than the lower limit threshold value D1, then there is the possibility that the setup (mounting condition) of the tool 30 shown in FIG. 5 is incorrect or that the tool 30 is chipped or worn. To correct the problem, the setup of the tool 30 is adjusted or the tool 30 is replaced with a new tool 30. If the internal diameter measurement value D is larger than the upper threshold value D2, then there is the possibility that the setup of the tool 30 is incorrect or that a built-up edge has developed on the tip of the tool 30. To correct the problem, the setup of the tool 30 is adjusted, the tool 30 is replaced with a new tool 30, or the built-up edge is removed.

After the problem with the tool 30 has been corrected by adjusting the setup, replacing the tool 30, or the like, the surface roughening control section 99 is restarted and surface roughening processing is resumed on either the existing base member (e.g., the cylinder block 1), if still useable, or a new base member (e.g., the cylinder block 1).

The thermally sprayed coating formation step S5 corresponds to diagram (d) of FIG. 3. The thermally sprayed coating 7 formed in this step covers the entire rough surface 13 and a portion of the internal diameter measurement surface 19. The thermally sprayed coating 7 is formed such that thickness of the coating 7 is substantially uniform across the rough surface 13.

As will be explained later, when the internal diameter measurement value D is larger, the number of times the thermal spray gun 31 used to form the coating 7 is moved reciprocally is increased in order to make the coating 7 thicker. Conversely, when the internal diameter measurement value D is smaller, the number of times the thermal spray gun 31 used to form the coating 7 is moved reciprocally is decreased in order to make the coating 7 thinner. As a result, the internal diameter of the cylinder bore 3 can be brought close to a specified value after the thermally sprayed coating 7 is formed.

Figure 8:
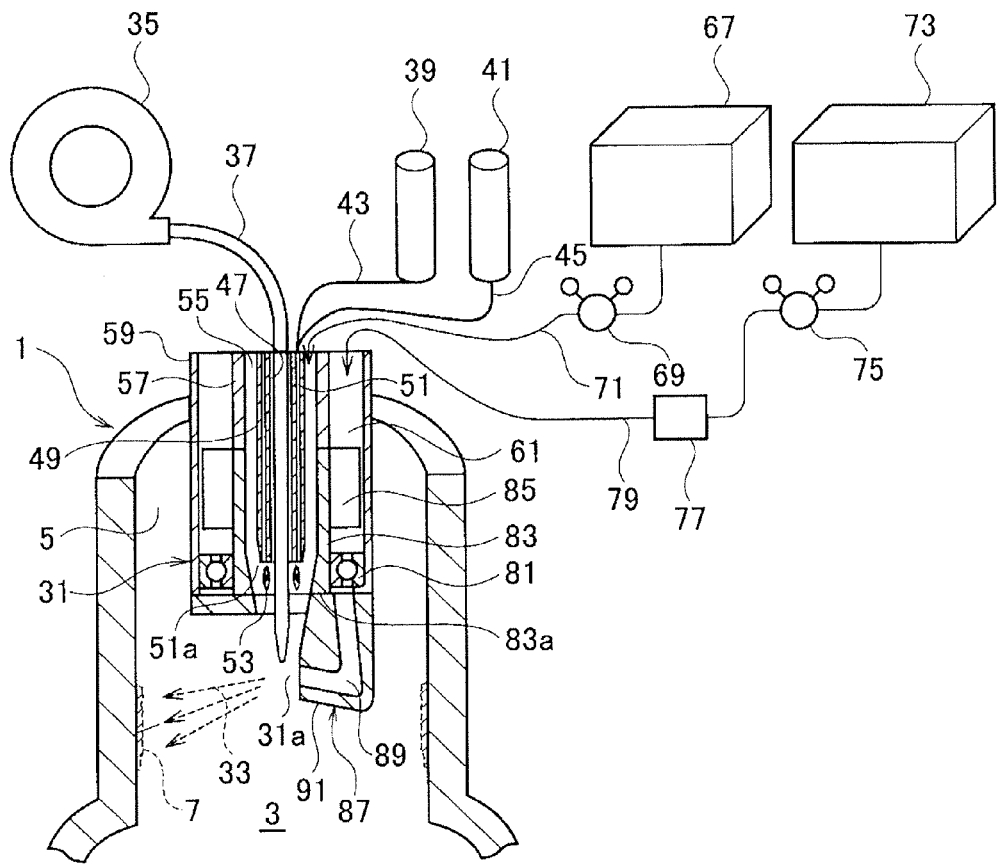
FIG. 8 is a schematic view of an entire thermal spraying apparatus for depositing a thermally sprayed coating onto the internal surface of the cylinder bore of the cylinder block shown in FIG. 1 after the cylinder bore internal surface has been roughened.

FIG. 8 is a schematic view showing the entire thermal spraying apparatus used to form the thermally sprayed coating 7 onto the internal cylindrical surface 5 of the cylinder block 1 after the internal cylindrical surface 5 has been roughened as shown in diagram (c) of FIG. 3. This thermal spraying apparatus includes a gas-fueled wire-melting type thermal spray gun configured to be inserted into the center of the cylinder bore 3. A ferrous metal wire material 37 used as the thermal spray coating material is melted and discharged from a thermal spray opening 31a in the form of molten droplets 33. The molten droplets 33 are deposited onto the internal surface 5 of the cylinder bore 3 so as to form a thermally sprayed coating 7.

The thermal spray gun 31 is configured to receive the ferrous metal wire material 37 fed from a wire material feeding device 35, fuel (e.g., acetylene, propane, or ethylene gas) fed from a fuel gas storage tank 39 through a pipe 43, and oxygen from an oxygen storage tank 41 through a pipe 45.

The wire material 37 is fed downward into the thermal spray gun 31 via a wire material feed hole 47 that is formed so as to pass vertically through a center portion of the thermal spray gun 31. The fuel and oxygen are fed into a gas guide passage 51 that passes vertically through a cylindrical portion 49 disposed around the outside of the wire material feed hole 47. The mixture of the fuel and oxygen flows out from a lower opening 51a (lower from the perspective of FIG. 8) of the gas guide passage 51 and is ignited so as to form a combustion flame 53.

An atomizing air passage 55 is provided on a more outer portion of the cylindrical portion 49 and an accelerator air passage 61 is formed still farther to the outside between a cylindrical partitioning wall 57 and a cylindrical outer wall 59.

The atomizing air passage 55 flowing through the atomizing air passage 55 serves to push the heat of the combustion flame 53 forward (downward in FIG. 8) while cooling the surrounding portions of the gun 31. It also serves to blow the molten wire material 37 forward. Meanwhile, the accelerator air flowing through the accelerator air passage 61 serves to blow the molten wire material 37 in a direction crosswise to the direction in which the wire material 37 has been blown by the atomizing air. As a result, droplets 33 of molten wire material 37 are blown toward the internal cylindrical surface 5 and form a thermally sprayed coating 7 on the internal cylindrical surface 5.

The atomizing air is supplied to the atomizing air passage 55 from an atomizing air supply source 67 through an air supply pipe 71 provided with a pressure reducing valve 69. The accelerator air is supplied to the accelerator air passage 61 from an accelerator air supply source 73 through an air supply pipe 79 provided with a pressure reducing valve 75 and a micro-mist filter 77.

The partitioning wall 57 between the atomizing air passage 55 and the accelerator air passage 61 is provided with a rotary cylinder part 83 configured such that it can rotate with respect to the outer wall 59 on a bearing 81. The rotary cylinder part 83 is disposed on a lower end portion of the partitioning wall 57 in FIG. 8. Rotary vanes 85 are provided on an upper outside portion of the rotary cylinder part 83 so as to be positioned in the accelerator air passage 61. The accelerator air flowing through the accelerator air passage 61 acts against the rotary vanes 85 and causes the rotary cylinder part 83 to rotate.

A tip member 87 is fixed to the tip end (bottom end) face 83a of the rotary cylinder part 83 such that it rotates integrally with the rotary cylinder part 83. A protruding portion 91 having a discharge passage 89 passing there-through is provided on a portion of the periphery of the tip member 87. The discharge passage communicates with the accelerator air passage 61 through the bearing 81. The aforementioned thermal spray opening 31a for discharging the molten droplets 33 is provided at the tip end of the discharge passage 89.

The tip member 87 provided with the thermal spray opening 31a is rotated integrally with the rotary cylinder part 83 while the thermal spray gun 31 is moved reciprocally along the axial direction of the cylinder bore 3. In this way, substantially the entire internal surface 5 of the cylinder bore 3 can be coated with a thermally sprayed coating 7.

After the thermally sprayed coating 7 has been deposited onto the internal cylindrical surface 5 of the cylinder bore 3 with a thermal spraying apparatus like that shown in FIG. 8, the thickness of the thermally sprayed coating 7 is adjusted in accordance with the internal diameter measurement value D acquired by the quality determining circuit 97 by appropriately setting the number of times the thermal spray gun 31 moves reciprocally in the axial direction of the cylinder bore 3. More specifically, when the internal diameter measurement value D is larger, the number of times the thermal spray gun 31 is moved reciprocally is increased in order to make the coating 7 thicker. Conversely, when the internal diameter measurement value D is smaller, the number of times the thermal spray gun 31 is moved reciprocally is decreased in order to make the coating 7 thinner. As a result, the internal diameter of the cylinder bore 3 can be brought close to a specified value after the thermally sprayed coating 7 is formed.

It is also possible to adjust the thickness of the thermally sprayed coating 7 by changing the amount of thermal spray coating material (the wire material 37 shown in FIG. 8) supplied. In other words, after the internal diameter is measured, the amount of coating material and other thermal spray conditions used to form the thermally sprayed coating 7 can be changed based on the measurement result. The number of times the thermal spray gun 31 is moved reciprocally in the axial direction and other thermal spray conditions are changed between steps S4 and S5 of the flowchart shown in FIG. 4.

As a result, the amount of coating material used to form the thermally sprayed coating 7 at a specified thickness of the coating 7 can be held to the minimum amount necessary and the material cost associated with the thermal spray process can be minimized. Also, formation of the thermally sprayed coating can be prevented when the internal diameter measurement value D is equal to or smaller than the lower limit threshold value D1 or larger than the upper limit threshold value D2, thereby avoiding waste of the coating material.

After the thermally sprayed coating 7 has been deposited onto the internal cylindrical surface 5 with a thermal spraying apparatus like that shown in FIG. 8, a lower portion of the cylinder bore 3 that includes the internal diameter measurement surface 19 is machined by grinding as shown in diagram (e) of FIG. 3. Although not shown in diagram (e) of FIG. 3, an upper end portion of the cylinder bore 3 is also machined (step S8). This grinding of the upper and lower ends of the cylinder bore 3 is accomplished using the same kind of boring apparatus as that shown in FIG. 5, which is used for the rough surface forming processing shown in diagram (c) of FIG. 3.

As shown in diagram (e) of FIG. 3, the lower end portion of the cylinder bore 3 that is ground includes the internal diameter measurement surface 19, an adjacent portion of the rough surface 13 immediately above the internal diameter measurement surface 19, the portion of the thermally sprayed coating 7 located on the adjacent portion of the rough surface 13, and the escape section 21 located below the internal diameter measurement surface 19. Thus, after the thermally sprayed coating 7 is formed, the internal diameter measurement surface 19 is removed along with a portion of the thermally sprayed coating 7 in the vicinity of the internal diameter measurement surface 19.

The lower end section is ground such that a cylindrical surface 93 is formed at the bottommost portion of the cylinder bore 3 and a tapered surface 95 configured such that its diameter narrows in the upward direction is formed above the cylindrical surface 93. The tapered surface 93 is formed across the entire thickness of the thermally sprayed coating 7 from the base material of the cylinder bore 3.

Since the portions of the thermally sprayed coating 7 at the axial ends of the cylinder bore 3, where the adhesion tends to be poor, are removed by the grinding process, the thermally sprayed coating 7 can be prevented from exfoliating due to stresses occurring in the poorly adhered portion during the subsequent honing process and the productivity of the cylinder block manufacturing process can be improved. Additionally, exfoliation of the thermally sprayed coating 7 resulting from the sliding resistance of a piston used in an internal combustion engine made with the cylinder block 1 can be prevented and the durability and reliability of the engine product can be improved.

When the poorly adhered portions of the thermally sprayed coating 7 are removed, adjacent portions well-adhered thermally sprayed coating 7 are also removed. As a result, the thermally sprayed coating 7 that remains after the grinding process can reliably maintain a high degree of adhesion with respect to the base material.

When the portions of the thermally sprayed coating 7 where the adhesion is poor are removed, some of the base material of the cylinder bore 3 is also removed. As a result, the poorly adhered portion of the thermally sprayed coating 7 can be removed reliably even if there is variance in the diameter and/or position of the ground portion from one cylinder bore 3 to the next.

After the lower end section of the cylinder bore 3 has been ground as shown in diagram (e) of FIG. 3, the thermally sprayed coating 7 is honed to finish the surface thereof (step S9). FIG. 9 is a cross sectional view of the cylinder block 1 showing the thermally sprayed coating 7 being honed with the honing tool 105. The honing tool 105 has the honing head 107 provided with, for example, four grindstones 109 containing grinding particles made of diamond or other material suitable for grinding. The grindstones 109 are arranged around the circumference of the honing head 107 with equal spacing there-between in the circumferential direction.

An expanding means configured to expand the grindstones 109 radially outward is provided inside the honing head 107. During the honing process, the expanding means presses the grindstones 109 against the internal surface 5 of the cylinder bore 3 with a prescribed pressure.

The surface of the thermally sprayed coating 7 is ground, i.e., honed, by rotating the honing tool 105 while simultaneously moving it reciprocally in the axial direction. The honing process completes the processing of the internal cylindrical surface 5. The honing process can be contrived to comprise a succession of rough finishing and fine finishing steps executed using grindstones of different particle sizes (grain sizes).

Although not shown in the drawings, an air discharge opening for internal diameter measurement is provided on the external periphery of the honing head 107. During the honing process, air is discharged from the air discharge opening and the internal diameter is measured using an air micrometer configured and arranged to detect the discharge pressure of the air and convert it into an electric signal indicating the internal diameter. The honing process is ended when the measured internal diameter value reaches a prescribed value.

Since the honing process is executed with respect to the thermally sprayed coating 7 only when the internal diameter measurement value D is larger than the lower limit threshold value D1 and equal to or smaller than the upper limit threshold value D2 (D1<D<D2), i.e., when the result of the surface roughening process applied to the internal cylindrical surface 5 was good, the amount of honing required can be minimized and the amount of wear of the honing stones 109 can be minimized, thus contributing to reducing the manufacturing cost.

After the honing is finished, the inside of the cylinder bore 3 is washed (step S10).

With the embodiment described heretofore, the result of a measurement of the internal diameter at an internal diameter measurement surface 19 formed on the internal cylindrical surface 5 is determined to be acceptable (i.e., good or bad) based on the prescribed threshold values D1 and D2. A subsequent step of forming a thermally sprayed coating 7 on the internal cylindrical surface 5 is only executed if the measurement result is good. As a result, waste of the coating material can be avoided and the thickness of thermally sprayed coating 7 (at the surface position of the coating 7) can be managed appropriately such that situations in which a defective part (defective cylinder block) is discovered after the thermally sprayed coating 7 is formed can be prevented.

Figure 10:
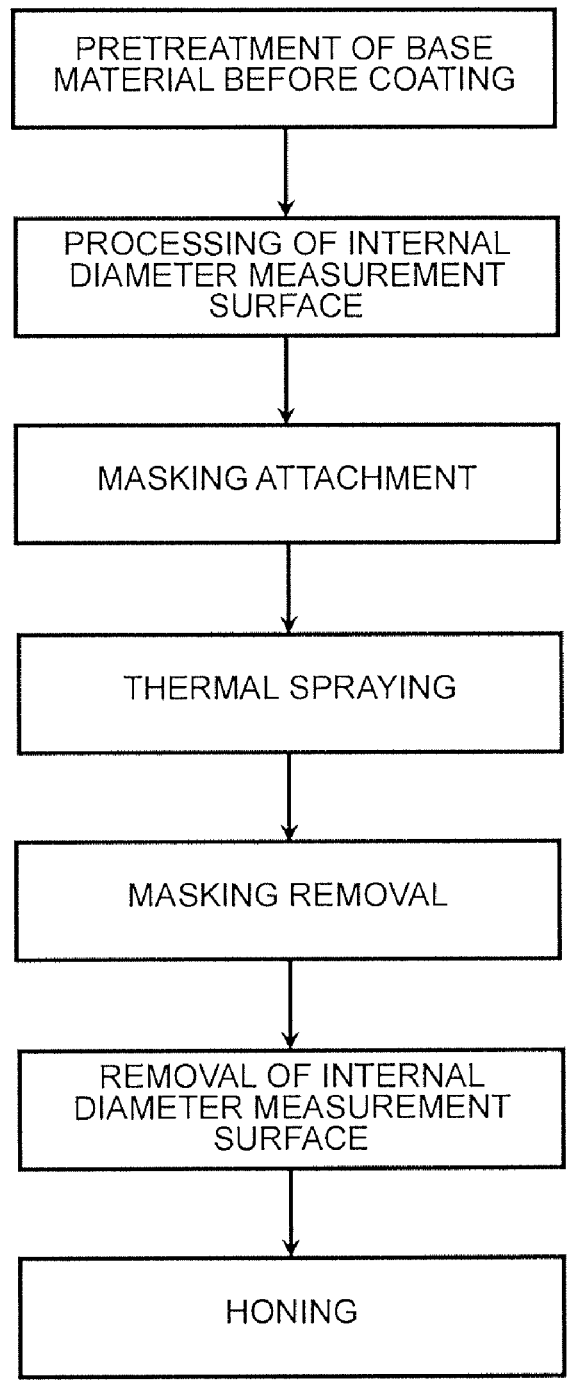
FIG. 10 is a work flow diagram illustrating the flow of processing steps from the base material surface roughening shown in diagram (c) of FIG. 3 to the finishing (honing) shown in diagram (f) of FIG. 3.

FIG. 10 shows the flow of processing steps from the base material surface roughening (pretreatment of base material before thermal spraying) and formation of the internal diameter measurement surface 19 shown in diagram (c) of FIG. 3 to the honing processing shown in diagram (f) of FIG. 3. After the base material surface roughening and before deposition of the thermally sprayed coating 7, a masking member (not shown in figures) is attached to the upper end portion of the cylinder block 1 and inside the crankcase 11 in order to prevent the coating material from adhering to portions where the coating is not required.

After thermal spraying the coating material, the masking member is removed and the vicinity of the lower end section is ground (internal diameter measurement surface removal processing) as shown in diagram (e) of FIG. 3. Finally, the coating is honed.

As described previously, the honing process is conducted by rotating the honing head 107 while moving it in the axial direction. When the bottommost end is reached, the honing head 107 is moved upward while continuing to rotate it. This up and down reciprocal motion is executed repeatedly.

When the honing head 107 shown in FIG. 9 reaches the bottommost end, the lower ends of the grindstones 109 are positioned below the thermally sprayed coating 7. As a result, the entire surface of the thermally sprayed coating 7 can be honed.

Although some of a portion 95a of the thermally sprayed coating 7 remains on the tapered surface 95 shown in diagram (e) of FIG. 3 after the honing process, as shown in diagram (f) of FIG. 3, most of this tapered portion 95a of the thermally sprayed coating 7 is removed by the honing process.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A cylindrical internal surface processing apparatus comprising:
    an internal diameter measuring device configured to measure an internal diameter of an internal cylindrical bore formed in a base member to obtain a measurement result of the internal diameter of the internal cylindrical bore; and
    a controller including a surface roughening control section and a quality determining section, the surface roughening control section being configured to control operation of a surface roughening equipment to form a rough surface section and an internal diameter measuring surface section on the internal cylindrical bore of the base member, with the internal diameter measuring surface section being smoother than the rough surface section, the quality determining section being configured to determine if the rough surface section is acceptable to allow a subsequent thermally sprayed coating to be applied on the rough surface section based on the internal diameter measurement result obtained by the internal diameter measuring device at the internal diameter measuring surface section of the internal cylindrical bore.

2. The cylindrical internal surface processing apparatus as recited in claim 1, wherein
    the quality determining section is further configured to determine an acceptability of the internal diameter measurement result obtained by the internal diameter measuring device is based on a prescribed threshold value for the base member being processed.

3. The cylindrical internal surface processing apparatus as recited in claim 2, wherein
    the quality determining section is further configured to determine that the measurement result of the internal diameter measurement is acceptable when an internal diameter measurement value is equal to or smaller than a first prescribed threshold value and larger than a second prescribed threshold value such that a honing process can be performed entirely on the thermally sprayed coating along the rough surface section without at least a portion of the base member being exposed by the honing process of the thermally sprayed coating after the thermally sprayed coating is formed.

4. The cylindrical internal surface processing apparatus as recited in claim 1, wherein
    the controller further includes an internal diameter measuring control section that receives the measurement results from the internal diameter measuring device.

5. The cylindrical internal surface processing apparatus as recited in claim 1, wherein
    the controller further includes a warning display device that outputs a warning in response the quality determining section determining the internal diameter measurement result obtained by the internal diameter measuring device is unacceptable.

6. The cylindrical internal surface processing apparatus as recited in claim 1, wherein
    the surface roughening control section is further configured to control operation of the surface roughening equipment such that a single tool is used to form the rough surface section and the internal diameter measuring surface section on the internal cylindrical bore of a base member.

7. The cylindrical internal surface processing apparatus as recited in claim 6, wherein
    the surface roughening control section is further configured to control operation of the surface roughening equipment such that the rough surface section and the internal diameter measuring surface section are formed by cutting with the tool while the tool is both rotated and moved axially with an axial feed speed of the tool being slower when processing the internal diameter measurement surface section than when processing the rough surface section.

8. The cylindrical internal surface processing apparatus as recited in claim 1, wherein
    the surface roughening control section is further configured to control operation of the surface roughening equipment such that the internal diameter measurement surface section has an internal diameter that is identical to a maximum internal diameter of the rough surface section as defined by a bottom of a recess of the rough surface section.

* * * * *